*INVENTOR.*
LOUIS A. THOMPSON

INVENTOR.
LOUIS A. THOMPSON

INVENTOR.
LOUIS A. THOMPSON

March 21, 1961 L. A. THOMPSON 2,976,349
METHOD AND APPARATUS FOR MAKING COLOR-CORRECTED SEPARATIONS
Filed June 10, 1957 6 Sheets-Sheet 5

INVENTOR.
LOUIS A. THOMPSON
BY
J. W. Douglas
His Atty

United States Patent Office 2,976,349
Patented Mar. 21, 1961

2,976,349

METHOD AND APPARATUS FOR MAKING COLOR-CORRECTED SEPARATIONS

Louis A. Thompson, Santa Barbara, Calif., assignor to N.E.A. Services, Inc., Cleveland, Ohio, a corporation of Delaware Filed June 10, 1957, Ser. No. 664,824

10 Claims. (Cl. 178—5.2)

This invention relates to improvements in methods and apparatus for making of pictures in color and more particularly to the making of reproductions from colored pictures by printing processes.

In the making of color pictures, it is common to use either a transparency from which the reproductions are made by transmitted light or an opaque picture where the reproductions are made from reflected light. The transparency may be a positive or a negative such as the well known "Kodachrome," and "Ektachrome" or "Ektacolor" and "Kodacolor."

Heretofore, it has been the customary procedure to make color separation negatives from the transparency by exposing on the separate films, the red, green and blue images. Then positives were made from these films and used either to make the color picture and used to make or reproduce the color picture in various ways well known in the art such as that in which a positive is a matrix which can be dyed so that the amount of dye at a point is a function of the exposure from the corresponding point on the negative. Each matrix is dyed with color complementary to that of the light used in exposing the corresponding negative. The positive made from the red negative is dyed cyan, so-called process blue; the positive made from the green negative is dyed magenta, so-called process red; and the positive made from the blue negative is dyed yellow; these are then transferred to a white base paper to form the final positive, this being known as the subtractive process.

It has also been proposed to provide a machine for making the so-called separation negatives wherein the positive, be it a transparency or an opaque picture, is secured to a rotating drum, scanned in elemental spots with white light and the reflected or transmitted light components are separated and then picked up by photocells and used to expose the separation negatives on three other drums synchonously rotated with the picture drum. It was also proposed to make a fourth negative, known as a black negative, for the purpose of a black printer which was used to add "snap" to the resultant picture particularly where the printing process was an ink process. Such an apparatus is shown in my Patent No. 2,415,051 of January 28, 1947.

In the previous processes, which were successful to a considerable degree, the black portions of the picture were obtained largely by the use of certain amounts of magenta, cyan and yellow, which, when printed in equal amounts on white paper, superimposed, produced black. But, as previously stated, this did not always provide the perfect picture, and hence it was not uncommon to use a black printer to supplement the black produced by these primary colors.

It will be appreciated that colors are very rarely pure colors but combinations of colors. For instance, in considering one color only, such as red, which we consider the hue of the color, there are other attributes of the red such as brightness and saturation. To a certain extent, the ranges of the color red that may be obtained with a pure red pigment are relatively limited. The extension of this range may be thought of as being extended laterally by the addition of yellow or cyan or as an extension in the direction of deepness which is by the addition of black or neutral density.

It can be understood that black, considered as a color pigment, is one of the cheapest colors that can be used whereas the primary colors, magenta, cyan and yellow are relatively expensive.

The present invention provides a greater economy in materials as well as a greater speed in production and a more realistic production by the subtraction from the color printers all of those components which I term as neutral density sometimes called "neutral color" which go to make up the various shades of black extending from but not including pure white through the various shades of grey to and including black. In other words, the broad concept of my invention although it has other inventive aspects, is the elimination from the color printers of all the neutral density color and providing printers of pure color only, and wherein no mixture of these pure colors is used to make any shade of grey to black, and using this neutral density to supplement the primary colors in reconstructing the picture by the provision of a black and white printer where all the color density has been removed.

It is particularly desirable to remove the neutral density and supply it by a "black" printer to the color values in the color printers without effecting the different degrees of neutral density found in the black printer. Likewise, the black printer can itself be varied or corrected to effect the deepness of the other colors.

It will be appreciated that by my invention the amount of neutral density removed from the color printer or the amount of color density removed from the black printer may be varied.

By this process, although separation negatives can be made, the greatest advantage is realized because the negatives can be eliminated and positive images may be simultaneously made from a colored picture, which positives may be used by the engraver, or the positives may be made on a matrix film which positives are used in the usual manner as printers. This is a great savings, not only in time but material.

By furnishing the engraver with positive images, not only is his work lessened, but the loss of linear tone gradation in the picture, which ordinarily occurs where a negative is first made and then a positive made from the negative, is not realized. As will be seen, the positive images may be made in the first instance from either a positive or negative transparency by a simple polarity reversing switch in the input circuit of the output amplifier.

It will also be seen that by a single piece of apparatus it is possible to record by tri-color only or as stated above by four colors considering the neutral density as a color.

By my invention, I am able to automatically provide color masking to eliminate unwanted colors and to control the individual colors as transmitted from the source to correct for filter deficiencies. I am also able to isolate the color from neutral density as well as isolate the neutral density to provide independent printers for magenta, cyan, yellow and neutral density.

It is well known to those versed in the art that filters as they exist today are not perfect in their spectral transmission particularly in the filters that are supposed to transmit red, blue and green, the most common defect being that they are not sharp band cutting filters but overlap each other somewhat in their spectral transmission. It is possible with the present invention to eliminate from the channel that is supposed to see a certain color the color that is seen other than the wanted color.

This enables a form of automatic, instantaneous, electronic masking to be effected.

In more detail, the invention is carried out by making magenta, cyan and yellow printers, by which only the hue and its brightness or saturation is provided and the other attributes of the picture which may be termed deepness is supplied by a black printer, the black taking the place of all the colors which would be combined to run the gamut of grey to black.

The elimination of the negatives, and use of the scanning currents from the red, blue and green sensitive cells to provide the printers without the intermediate step of making negatives which will provide the magenta, cyan and yellow printers is effected by a circuit, constructed according to my invention, wherein when the red is scanning red, it does not record red but instead, magenta and yellow are recorded, which, when combined, make red. Likewise, when green is being scanned green is not recorded but cyan and yellow are recorded, which makes green, and, in the case of scanning blue, cyan and magenta are recorded, which makes blue. These being the primary subtractive colors, any color may be realized corresponding to the original. It should be also borne in mind that the circuits allows the recording of the neutral density without any color and color without neutral density which in the final printing process greatly simplifies the operation as well as reduces the cost of such reproduction from the standpoint of time and labor as well as materials.

In order to better understand the invention, reference is made to the following drawings wherein.

Figure 1:
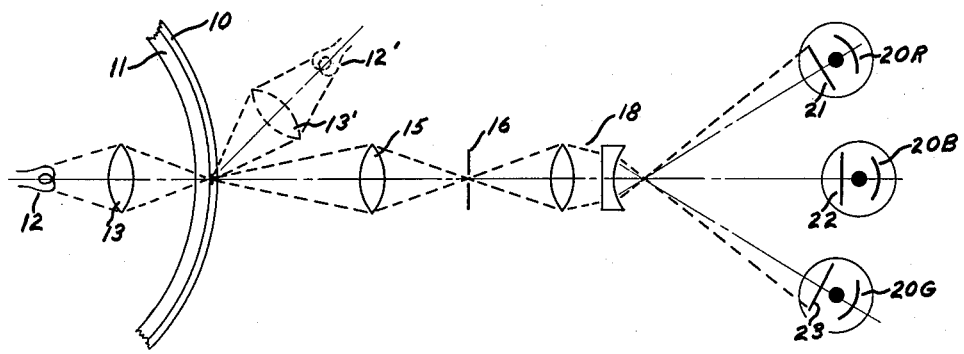
Fig. 1 is a diagrammatic view of a scanning system useful in connection with my invention.

Referring now to the drawings throughout which like parts are designated by like reference characters and more particularly to Fig. 1; as previously stated, the colored picture 10 to be reproduced, be it transparency, opaque, negative or positive, is secured on a transparent drum indicated diagrammatically at 11. This is illuminated by a white light source 12 which is concentrated in a spot by a lens 13 on the transparency and is known as transmission scanning. If the picture is opaque, it will be illuminated exteriorly of the drum by the light source 12' and the lens 13'. In the first instance, the light will be transmitted light, and in the second, it will be reflected light, known as reflection scanning. Since this is the only apparent difference between using transparencies or opaque pictures for reproduction, the description hereinafter will refer only to the original picture, but it should be borne in mind that the term includes both transparencies and opaque pictures.

The drawing illustrates a rotatable drum, since this is a very convenient and simple way to provide the scanning. Basically, the drum is rotated and the scanning system moves longitudinally of the drum, as described in the aforementioned patent, to scan the picture in a helical path.

At this point, I wish to point out that other systems of scanning can be effectively used. This contemplates moving the drum and having the scanning system stand still or mounting the picture on a flat surface and scanning it by a reciprocating scanner in straight longitudinal lines. The invention is therefore not limited by any particular method of scanning movement of which there are many known in the art.

The light, being concentrated in a spot in the picture, is either transmitted through or reflected from the picture and focused by a lens system 15 onto an area limiting aperture mask 16. From the mask 16, the rays of light pass through a negative dispersing lens system 18 which defocuses the image, causes the light to spread out and fall with equal intensity upon three separate phototubes 20R, 20B and 20G. These tubes are preferably of the photomultiplier type of which there are a number available on the market such as (RCA 931A) which is particularly suitable.

Here again it should be pointed out that, although photo-multiplier tubes are described, because they have a large amplification of voltage developed by a relatively weak light, that it is quite within the purview of my invention to use other types of photo-sensitive cells or elements which, with suitable voltage amplification, could be made to operate satisfactorily without departing from the primary concepts of the invention.

The photo cells should be connected to provide the proper sensitivity of the cell for the kind of light they are to record. In this instance, since the cells are particularly sensitive in the blue-green part of the spectrum, filters, indicated at 21, 22 and 23, are placed in front of the cell windows.

A suitable combination which I have found to give satisfactory response is a combination of Wratten Nos. 25 and 33 for cell 20R, No. 47 for 20B, and No. 61 for 20G.

At this point, it should be pointed out that the circuits for the cells, which I will classify as being R (red), B (blue) and G (green), function in two ways; they operate collectively and independently to provide outputs so that each cell develops voltages according to red, blue or green light. By the circuit of my invention, it is possible to eliminate any neutral density and record color only on three separate films and also their outputs may be combined and the color removed to record the neutral density of the picture on a fourth film.

Briefly, this is effected by arranging the outputs so that when scanning a picture, if the red, green and blue cells all see the same thing, such as white, black or grey, they all cooperate to record on the black printer. Individually, they do nothing separate from each other. When, however, they see things differently among themselves, then the cell with the greatest output (the one that sees the most) does nothing, but the others record the differences between themselves and the one that sees the most. Thus, assuming R sees a value of 3, G sees a value of 2, B sees 1. Then G records 3-2 or 1 (magenta); B records 3-1 or 2 (yellow); and R does nothing except to assist with the others in recording on the fourth record to provide neutral density.

*Photo multiplier and contrast control*

Figure 2:
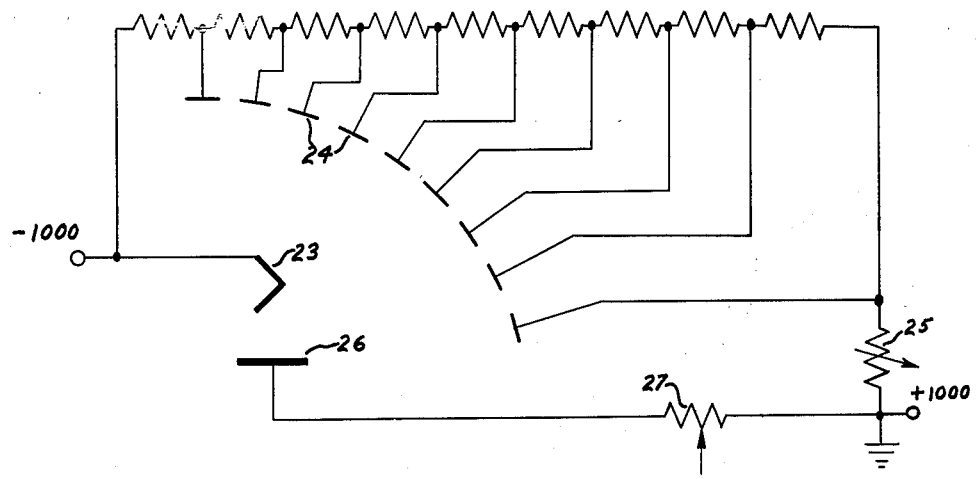
Fig. 2 is a schematic of a photo-multiplier tube circuit.

The circuit for the photomultiplier tubes 20R, etc., may be conventional, as shown in Fig. 2. The cathode 23 has a negative voltage of 1,000 volts applied and each of the dynodes 24, Nos. 1 to 9, are connected by 100K ohm resistors. Between No. 9 dynode and ground is a 5K ohm variable resistor 25. The anode 26 connects to the ground, which is at a positive potential of 1,000 volts, through the load resistance 27.

As can be seen, this enables the contrast range in each of the color signal channels to be controlled independently of the others, and they may all be adjusted so that all channels have the same or desired contrast range.

The signals from the photo-multiplier tubes are each connected to the input circuit of a D.C. amplifier by means of the potentiometer 27 disposed in the anode load circuit of the photomultiplier, the variable arm of which is connected to the grid. The amplifier circuits may be conventional.

There then appears on the anode of each amplifier a signal that is representative of the color being scanned in each of the red, green and blue channels.

It then remains to take these signals which contain not only color, but neutral density and record the separate colors in terms of the complementary colors as positives and to record the neutral density as a positive, whereby the resultant records may be used to compose the final picture.

*General color circuit description*

Briefly, given the color channel signals from the output of the amplifiers, the novel method comprises extracting from the signals the separate colors in the form of complementary colors; combining the signals to provide a full panchromatic signal; combining the color signals to make a tri-color signal; and subtracting the tri-color signal from the full panchromatic signal to provide a neutral density signal.

Figure 3:
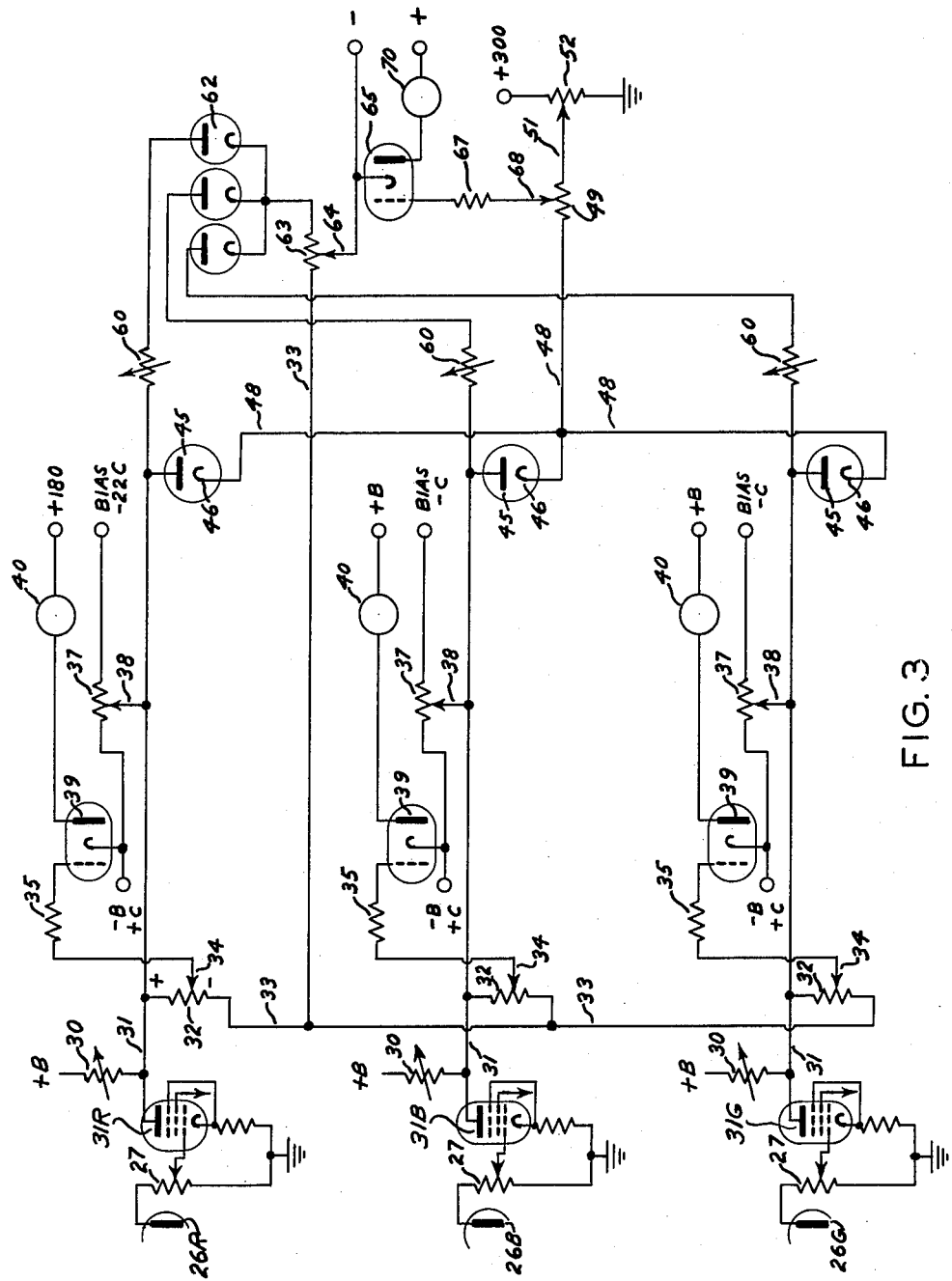
Fig. 3 is a schematic view of a complete circuit from the output of the photomultiplier tube to the exposing crater lamps, embodying my invention.

Fig. 3 is a schematic view of a circuit which enables me to obtain the results previously discussed. As can be seen, the anodes of the photomultiplier tubes, each represent the red, blue and green scanning signals. An important aspect of the invention is that although the signals or voltages present in these circuits result from the scanning of the picture through the red, blue and green filters, the recording of the complementary colors is accomplished by properly combining the signals in the network about to be described. The recording, as stated, is preferably by the use of crater lamps, but is not limited thereto; and, although it will be described as being in the positive sense, it can also be in the negative sense when desired, an instance being where a Kodacolor or Ektacolor original is being scanned. In the figure, which is a schematic of the apparatus of my invention from the anodes of the photomultiplier to the recording lamp, the anode voltage to the amplifier stages is supplied through the variable resistors 30.

In the anode circuit of the amplifier each anode is provided with load resistors 32 in the form of potentiometers the upper ends being connected by the lead 31 to the anode and the other ends of which are all connected to a common lead 33. The slider 34 of each potentiometer 32 is the takeoff point for the color recording circuits, these circuits also being connected to the lead 31.

Each of the color takeoff circuits includes an amplifying stage wherein the grid of the amplifier tube is connected through the resistor 35 to the slider 34. The cathode is maintained above ground potential and the grid sufficiently to cause minimum exposure in the abcence of a signal. The cathode is also connected to the negative side of a 180 volt crater lamp power supply. The slider 38 on potentiometer 37 may vary the grid to cathode bias from 0 to 22 volts.

The crater lamp can be of a glow modulator tube of the type manufactured by Sylvania known as No. 1131C. The slider 38 of the potentiometer 37 connects to the lead 31 and the positive side of the crater lamp voltage supply is connected to the anode 39 through the crater lamp 40. The crater lamp circuits are all arranged so that when no signal is on the grid, no current is being drawn and therefore there is no light output from the crater lamp and nothing is recorded. It should be borne in mind that the printer being made is not a negative but is a positive, and that in these circuits just described, that color only is recorded with all neutral density removed. A further explanation of the manner in which these results are realized will appear later.

The remainder of the circuit is concerned with the recording of the neutral density on a single positive, with all color removed.

Connected to each of the anode leads 31 are diodes 45. Each diode 45 has its anode connected to one of the leads 31 and the cathodes 46 are all connected to a common lead 48. This lead connects the cathodes to ground through the potentiometer 49 and through the slider 51 of the potentiometer 52 which is connected across a power supply that may be 300 volts.

At this point, it may be well to note that the color takeoff circuits do not connect to ground. They only record voltage differences between each other and these voltage differences exist in this part of the circuit because of color and because the channels all respond equally to neutral density, no neutral density is recorded.

In the circuit just described, however, these diodes are across the color channels to ground. Therefore, at the lead 48 a signal is present that consists of all colors and neutral density, properly termed a full panchromatic signal.

The leads 31 are also connected through variable resistors 60 to the separate anodes of three diodes 62. The cathodes of these diodes are connected together and through a common load resistor 63 to the line 33.

The load resistor 63 is a potentiometer, the slider 64 of which connects to the cathode of the neutral density amplifier 65. The signals on the anodes of the diodes 62 are the color channel signals plus neutral density with respect to ground, which, if combined, would be a full panchromatic signal. However, since the cathodes are not grounded, the signal on the cathodes or across the load 63 is a tri-color signal without any neutral density and this is the signal that is applied to the cathode of the neutral density amplifier.

The grid of this amplifier is connected through the resistor 67 to the slider 68 of the potentiometer 49 at which point a full panchromatic signal is present. Therefore, this panchromatic signal is on the grid. The tri-color signal on the cathode biases the tube so that no color in the panchromatic signal as applied to the cathode is reproduced and the tube then only draws current according to neutral density present. Therefore, in the crater lamp 70, neutral density is produced.

*Color only recorder*

As was previously pointed out, the signals in the color channels in which signals appear due to the scanning through the red, green and blue filters, are utilized to reproduce the complementary colors as positives, which are the colors used in the subtractive system, without any neutral density, to produce the three color printers.

Figure 4:
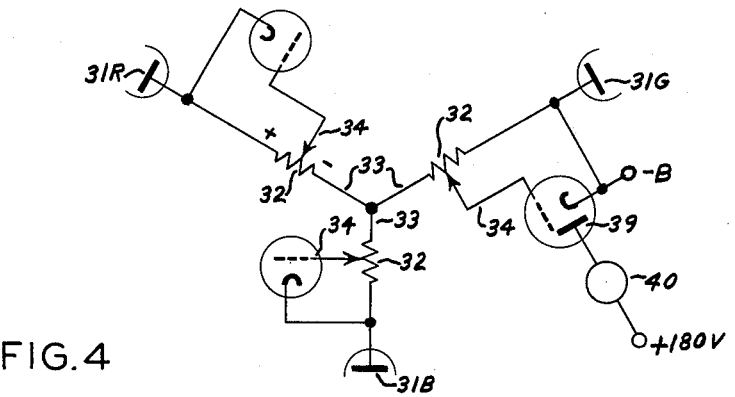
Fig. 4 is a simplified schematic of the color only exposing part of the system.

The manner in which the color alone is removed from the signal, converted to a complementary color and recorded as a positive may best be understood by reference to Fig. 4 which is a simplified schematic of that portion of the circuit which enables the separation of the separate color signals.

In this figure it is seen that the anodes 31R, G and B of the color channel amplifiers are all connecting through the potentiometers 32 and leads 33 to a common point. The signals for the cyan, magenta and yellow printer amplifier circuits are taken off through the sliders 34 across the resistors 32. Only one anode 39 connected to a crater lamp 40 which in turn is connected to 180 volts power supply is shown, but it will be appreciated that a crater lamp is disposed in each of the color legs.

In the recording of color only, first without any color in the color circuits, they are adjusted so that the crater lamp recorders are biased to provide no recording.

Then, assuming red is being scanned, adjusting the red photomultiplier tube circuit to put out a negative supply voltage which when applied to the grid of the amplifier tube causes the voltage on the anode of the red amplifier 31R to go higher. When the anode 31R rises in voltage, since the anodes 31G and B are at a lower voltage, current flows from the red anode through the resistor 32 and leads 33 to the blue and green amplifier anodes. It will be noted that it is the difference between color anode voltages that is being recorded and that the magneta and yellow printers will later be used to produce red. At this time, nothing is recorded in the red circuit (cyan) because the cathode of the cyan printer amplifier is at a higher positive potential than the grid, or the grid is negative with respect to the cathode. The current does flow by way of leads 33 through the other resistors 32 toward the green and blue anodes 31G–B from the red anode in equal amounts causing the grids of the magneta and yellow crater lamp amplifiers to go less negative with respect to their cathodes and current flows in these amplifier circuits resulting in exposure by the crater lamps of the magneta and yellow printers because the positive color voltage minimizes the negative bias. No neutral density is recorded at this time because the red color current flowing through the diode 62 and the potentiometer 63 to line 33 sets up a voltage on the cathode of the neutral density amplifier which is equal to the voltage generated by the current flowing from the red amplifier anode through the diodes 45—46 and the potentiometers 49 and 52. This balance in voltage between the cathode and grid of the neutral density amplifier tube satisfies a no record condition for the black and white (neutral density) recorder.

*Neutral density recorder, panchromatic signal takeoff*

The neutral density is recorded by removing from the color channels a full panchromatic signal at the same time removing a signal which is a tri-color signal without neutral density and subtracting the tri-color signal from the panchromatic signal to leave only the neutral density.

Figure 5A:
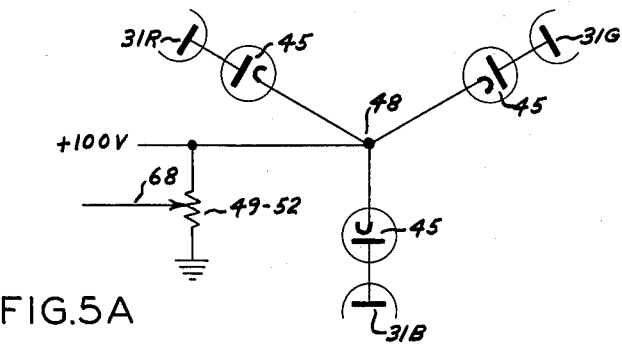
Fig. 5A is a schematic diagram of the panchromatic signal take-off circuit.

The full panchromatic signal is obtained by means of the diodes having their anodes connected to the color channels and their cathodes connected together with a common load resistor to ground. The simplified circuit of Fig. 5A shows more clearly how this is done. Three diodes 45 are provided having their anodes connected by leads to the anodes 31R, G and B of the color amplifier channels and their cathodes connected to a common lead 48. The lead 48 has 100 volts on it from the power supply and connects through the resistors 49—52 to ground. The signal is taken off of the load resistor 49 by the slider 68, and, as stated, since the circuit is to ground, the combined signals of all three channels including all colors and black to white or neutral density are present. As can be seen from Fig. 3 the slider 68 connects to the grid of the neutral density amplifier tube throughout the resistor 67. Therefore, a full panchromatic signal is applied to this grid.

*Tri-color takeoff*

Figure 5B:
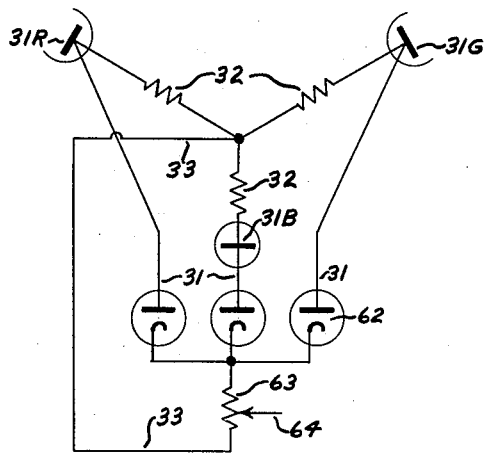
Fig. 5B is a simplified schematic diagram of the tri-color take-off circuit.

The manner in which the colors without neutral density or tri-color is obtained is illustrated in the simplified diagram of Fig. 5b. It will be remembered that so long as the color channels are not connected to ground, the signals representative of color are obtained because of the difference in potential between the channels. Only when the signals are removed from the channels and ground does the neutral density appear. Therefore, it is possible to combine all these signals and have tri-color only and no neutral density. The anodes of the color amplifier channels 31R, B and G are all connected together through the load resistors 32 to a common lead 33. They are also connected by the leads 31 to the anodes of three diodes 62. The adjustable resistors 60 are omitted in this diagram in the interest of simplicity, since they merely enable these individual colors to be controlled. The cathodes of the diodes 62 are all connected together and through the load resistor 63 to the lead 33 which, as stated, was the lead to the meeting point of the resistors 32. The signal, taken through the slider 64 from potentiometer 63 is a composite of the color in the color channels without any neutral density or tri-color.

As shown in Fig. 3, this signal is applied to the cathode of the neutral density amplifier tube 65. At the same time the full panchromatic signal is applied to the grid. The output from the tube then contains only the difference between the two which is neutral density with color removed.

*Color correction*

It will be appreciated that the ultimate step in making a colored original by the subtraction process may include making portions that are dyed with the primary subtraction colors and the dye transferred to paper or the dyed transparencies superimposed or that color plates can be made and the final print made from the plates. In the following discussion, when I refer to "printer" I mean any one of the above.

In the reproduction of pictures by the subtraction process, it is apparent that, considering the primary colors being scanned, scanning of red ultimately results in the reproduction of that red by the combination of yellow and magenta printers, and that:

Green is reproduced by yellow and cyan.
Blue is reproduced by magenta and cyan.

Therefore, it is apparent that each of the three colors reproduced is reproduced by pairs of colors, and that there are three pairs of colors. It will also be noticed that, among the three pairs of colors, taking any two of the pairs there is always one color therein which is also common. For instance, in the pairs that make red and green, yellow is common to both.

By the method and apparatus of my invention, I eliminate the making of separation negatives, and make the final positives, matrixes or printers direct by using the red signal voltages to cause the recording on the positive films of yellow and magenta. The green signal voltage to record yellow and cyan and the blue, magenta and cyan.

This is done, as previously stated by scanning the film in elemental spots and causing an instantaneous comparison of the signals in all three of the color channels and holding back that color channel that produces the highest voltage and causing the others to print by a voltage which is the difference between it and the higher voltage.

With the above circuits, assuming at any one moment that the red channel is scanning pure red and there are no voltages due to color in the green and blue channel. Then the green channel is made to expose the magenta printer and the blue channel the yellow printer. We might say this exposure is in equal amounts, but as will hereafter appear more clearly, it actually is in amounts proper to cause a correct rendition of the red when these two printers are later combined. Therefore, under the above conditions, the red channel causes the green channel to print magenta and the blue channel to print yellow. For all three channels, the above may be expressed as follows:

$$R = M_{GR} \ Y_{BR}$$
$$G = C_{RG} \ Y_{BG}$$
$$B = C_{RB} \ M_{GB}$$

The above simply means that red causes magenta to be produced by the green channel and yellow to be produced by the blue channel. The green and blue channels are then stated in the formula in a like manner.

Heretofore, it was common practice to provide for color correction prior to or at the time of making of the final print, this correction being necessary because of deficiencies in filters and materials, by a so-called masking process. If a correction was to be made in any of the printers, it was usually made by making a weak positive from the red and green filter separation negatives which positives were combined with the red and green and blue filter negatives in exposing the final printers. Sometimes a weak negative was made from the original and combined with it to provide certain corrections. These processes are well known to those versed in the art and as can be appreciated required great skill, time and patience and resulted in a considerably greater cost for the ultimate reproduction. An important fact to be borne in mind, however, was that when a mask was made for one of the printers, it controlled all of the color in that printer and did not discriminate against those parts of the printer representing certain color which ultimately made different colors when printed. For example, it was shown above that red was composed of yellow ($Y_{BR}$) and magenta ($M_{GR}$), which colors were derived from the original scanning of red, and that green was composed of yellow ($Y_{BG}$) and cyan ($C_{RG}$) derived from the original green. In the ultimate yellow printer, therefore, there is yellow to be printed that is derived from two separate colors and will be used to remake two separate colors. This yellow, however, is all in the one printer. The previous masking process did not take this into consideration and, therefore, a correction for one color often caused an over or under correction of another color.

By my present invention, I can completely control the color as it comes from each channel in such a manner that I can, in the printer, make a correction for the yellow that is used in making red without affecting the yellow that is used in making the green. This control can be effected on each of the colors derived from the red, green and blue channels without affecting the others and thus electrically full and complete masking and color correction effected to compensate for all the existing deficiencies in filters and material.

Figure 6:
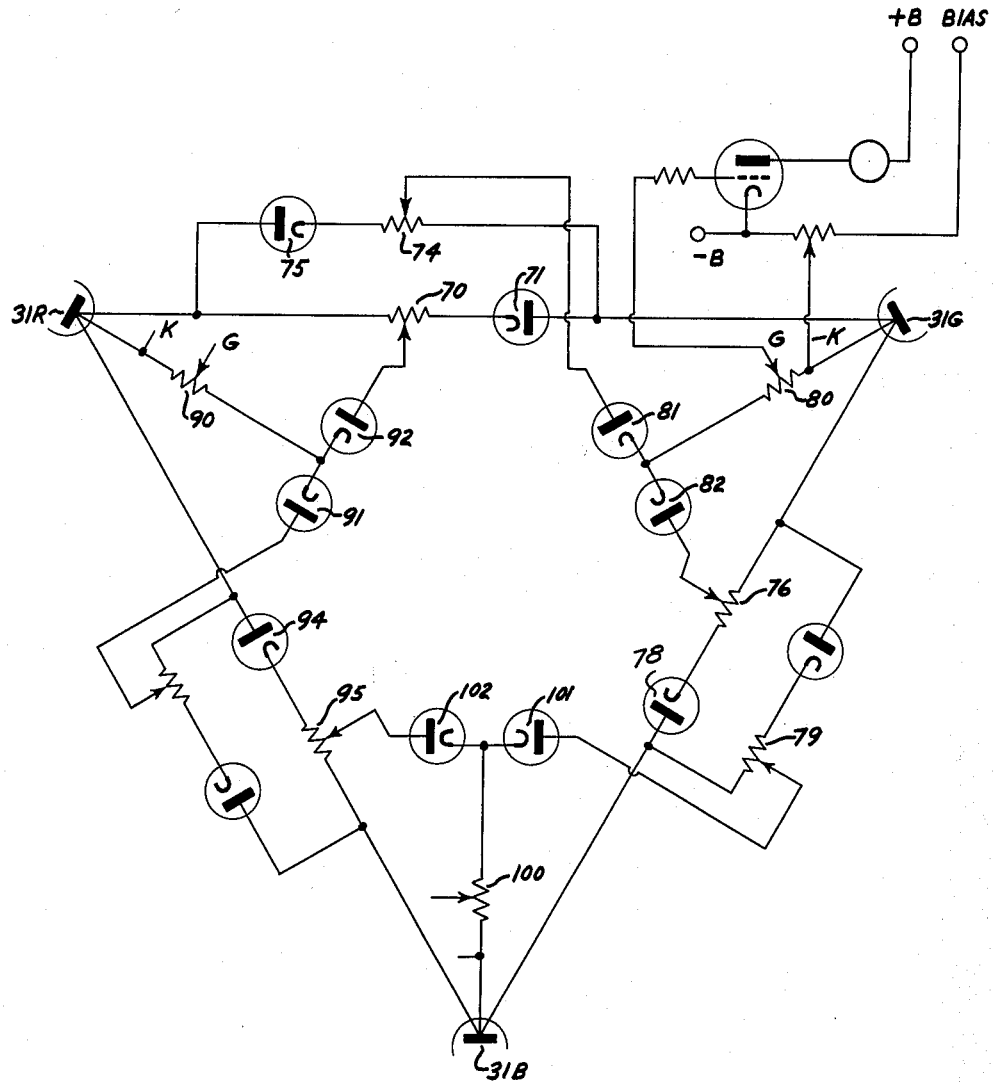
Fig. 6 is a schematic view of a modified form of the color only circuit which illustrates a color masking control.

It can be effected by arranging a circuit such as shown in Fig. 6. This circuit corresponds to the circuit shown in Fig. 4, in that it removes color only but in addition allows a correction of the color to be made. Anodes 31R, G and B represent the anodes of the color channel amplifier tubes. It will be noted that 31R connects to 31G through a potentiometer 70 and a diode 71, the anode of the diode being connected to 31G, and the cathode to the end of the potentiometer 70 most remote from 31R. It will also be noted that 31G connects to 31R through a potentiometer 74 and a diode 75 and that the anode of diode 75 is connected to 31R. It will be seen, therefore, that if a voltage rise occurs in either 31G or R, current may flow in either direction through one leg or the other of the interconnected circuits. Exactly similar connections are made between 31G and 31B, and 31B and 31R. Therefore, current can flow from any anode to the other depending on which anode has the higher voltage.

In addition to the foregoing, each amplifier anode connects to the cathodes of a pair of diodes through a load resistor and the anodes of these diodes are each connected to the potentiometers in the cathode circuits of the diodes in adjacent legs of each color channel where the diode cathodes are connected to that color channel through the potentiometer. For instance, in the case of 31G, a resistor 80 connects the anode 31G to the two cathodes, which are tied together, of the diodes 81 and 82. The anode of 81 connects to the potentiometer 74 and that of 82 to the potentiometer 76. Both potentiometers 74 and 76 connect the cathodes of diodes 75 and 78 to anode 31G.

Likewise, each of the other color channels are connected to adjacent legs in a similar manner.

Assuming that the green channel amplifier 31G has a rise in voltage due to the channel seeing green, then, since this voltage is higher than 31R and 31B, current will flow in both adjacent legs from 31G to 31R and 31B. The anode of the diode 71 being more positive, a voltage drop will occur across resistor 70 ($GC_g$). The resistor 90 that connects to anode 31R and the cathodes of diodes 91 and 92 will also have a voltage drop across it because the anode of 92 is at a higher potential than the cathode. This voltage drop will be recorded in the cyan color printer, because the color printer amplifier is connected across this resistor to the points marked K and G (cathode and grid). The magenta color printer amplifier which takes the signal from resistor 80 graphically illustrates how the cyan printer would be connected at 90 and the yellow printer at 100.

At the same time, yellow is being recorded because of the voltage drop in resistor 100 which connects the cathode of diodes 101 and 102 to 31B.

By this circuit, when the green channel has a signal due to scanning green, the colors yellow and cyan, which are combined in the printers to make green, are being recorded. It should be particularly noted that the amount of the green signal which is used to make the cyan printer can be controlled by varying the position of the slider at potentiometer 70 in 31G to 31R leg, and that the amount of green signal used to make the yellow printer can be controlled by the slider on the potentiometer 79 in the 31G to 31B leg.

In a like manner should the voltage in the red amplifier circuit 31R rise due to the fact that red is being scanned, a signal will be recorded in the magenta (magenta record) circuit due to the voltage drop in potentiometer 74 which causes the diode 81 to become active and current to flow in potentiometer 80. At the same time, yellow will be recorded in the yellow recorder circuit due to the voltage drop across resistor 100 because current will flow through the diode 94 in the 31R to 31B leg and through the potentiometer 95 by way of the diode 102.

As previously stated, we thus have yellow recorded due to seeing green and also due to seeing red and the amount of each may be varied to provide the desired color correction. Thus a single yellow printer which is later used in the printing to produce both red and green may have corrections made in it for the red independently of those for the green and vice versa.

The above circuit is particularly useful where it is desired to conserve signal voltages. When a large signal is present throughout the process the circuit may be greatly simplified by the elimination of the diodes, such as 75 and 71. As in the 31R to G circuit, in each of the outer circuits between 31R, G and B. In this case the flow from the anode at the higher potential to the anodes of lower potential is then through the parallel resistors such as 74 and 70. Otherwise, the manner in which the signal is removed is exactly the same.

Figure 7:
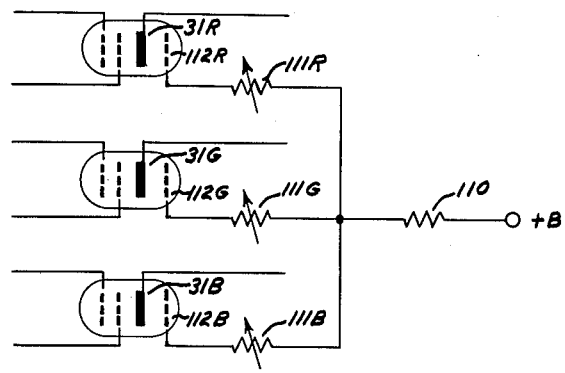
Fig. 7 is a schematic view of a modification of the color channel amplifier circuits.

Another refinement of my invention is illustrated in Fig. 7, which enables a further correction to be made due to the transmission characteristics of the filters and the photomultiplier tube. As previously stated, the color channel amplifier had a rise in voltage when a color was being scanned due to the output of the photomultiplier putting a negative voltage on the grid of the amplifier. Normally, the amplifiers are all adjusted, so that with no signal on the grid the plate voltage will be at 100 volts due to current drain. When a signal is applied, the decrease in plate current due to the grid going more negative may cause it to rise as much as 150 volts or to 250 volts. Under these conditions the amplifiers for the channels that are not seeing color should still remain at 100 volts. But since all three channels are activated from one source of light and only differentiate because of the interposition of filters between the light source and the photo tube, and since the filters are not perfect and usually pass some light other than that desired, I find that a signal may also be present in the other color channels which is an unwanted signal.

Elimination of this unwanted signal can be accomplished by increasing the voltage ratios in the three anode

(31) circuits. This can be done because it is possible to control plate current and therefore the plate voltage of a vacuum tube by varying the screen voltage. An increase in screen voltage causes an increase in plate current thereby reducing the plate voltage.

As can be seen in Fig. 7, the supply voltage for the three color channel amplifier tubes 31R, G and B is through a common voltage dropping resistor 110 to the individual variable resistors 111R, B and G, and thence to the screens 112R, G and B.

If the amplifiers are adjusted without any signal so that the anode voltage on each is 100 volts and if 31R sees a red signal, the voltage on the anode 31R will rise. Now nothing is supposed to happen in the other channels but as stated, there is a rise in voltage due to the presence of an unwanted signal. When the voltage on the screen 112R rises (which it will, due to the grid going more negative), there will be less current through the common dropping resistor 110 and less voltage drop. This causes a rise in the power supply voltage which also raises the voltage on the other two screen grids 112G and B, and since there is a rise in these screen voltages, there is also a drop in plate voltage on each of these tubes 31G and B.

Then, instead of a spurious signal being recorded, with proper adjustment of the resistors 111, correction can be made for the unwanted color in these channels and only the channel in which a signal is desired has a signal. In this manner the desired anode voltage ratios and therefore the desired color ratios can be established.

Figure 8:
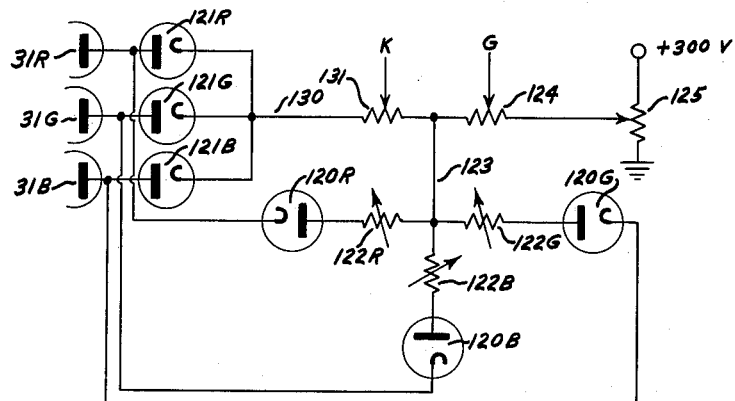
Fig. 8 is a schematic of a modified form of neutral density recording circuit.

Another refinement of my invention is shown in Fig. 8 where a different type of neutral density recording circuit is shown and which enables a greater degree of control to be obtained for the neutral density printer.

In this case each of the color channel amplifier anodes has connected to it a pair of diodes 120R, G and B and 121R, G and B, the first of which have their cathodes connected to the anode 31 and the others their anodes connected to the anode 31. Each of the diode anodes 120 is provided with a variable load resistor, 122R, G and B in series therewith and their ends are connected together and to a common lead 123. This lead 123 connects to the end of potentiometer 124, the other end of which is connected to the slider on the potentiometer 125; the upper end potentiometer 125 has a potential of 300 volts applied to it and the lower end is grounded.

The diodes 121 have the cathodes all connected together and are connected by the lead 130 to the end of a common load resistor 131, the other end of which connects to the end of potentiometer 124.

The signal is removed from the sliders of 131 and 124, the slider at 131 connecting to the cathode of the recording circuit and the slider of 124 connected to the grid.

As previously stated, the anodes 31 of the color channel amplifier tubes are at 100 volts potential when no signal is in the color channels. For the purpose of explanation, two conditions can be considered to exist during operation, one where the channels "see" neutral density and the other where one channel "sees" color. Under no signal conditions each color channel amplifier anode is at 100 volts and there is no unbalance between them. This being the state of the circuit when "black" is being scanned. The anodes 31 being at 100 volts, the slider on the power supply potentiometer 125 is set at 100 volts above ground; therefore, all parts of the circuit except the potentiometer 125 are at equal potential and there are no voltage differences between K and G therefore in the neutral density recorder circuit, black is being recorded because the record circuit is drawing maximum current and the crater lamp is providing the greatest output. The presence of a color signal causes the anode 31 for the channel seeing the color to rise in voltage due to current reduction while the others remain at the same voltage. In the presence of neutral density causes all channels see alike and all the anode voltages on tubes 31 rise an equal amount.

The viewing of "white" for instance would cause all anodes to rise to the maximum anode voltage of 250 volts whereas any shade between "black" which is represented by 100 volts and "white" (250 volts) would cause the anodes to have a voltage rise depending on how far the neutral density being scanned departed from "black."

In viewing white, all of the anodes 31 would rise to 250 volts. This would cause the diodes 121 to conduct and the cathode voltages would also be at substantially 250 volts. Since the voltage at 125 has been set at 100 volts, there would be a potential difference across resistors 131 and 124 of 150 volts. This would cause the grid of the recorder tube to go negative, the tube would draw no current, and the crater lamp would cease to glow and no exposure would result, leaving the film "picture white." It will be noted that the cathodes of the diodes 120 are all positive at this time. Therefore, no current flows in that part of the circuit.

If "red" or any other color is being scanned it is desirable that the neutral density printer does not record. If red plus under color is present then the neutral density circuit will record under color but will not record the red. The voltage on anode 31R would rise to 250 volts or some value lower, depending on the saturation. This causes the cathode circuit of the tubes 121 to rise to 250 volts which places a 150 volt differential across the potentiometers 131—124. Current flow, in this instance, is to potentiometer 125 which is at a lower potential, but it should be noted that only one cathode 129R of the diodes 120 is at 250 volts, and that the others are all at 100 volts. Since only one channel has a voltage rise it will be apparent that insufficient current will be drawn to bias the recorder amplifier at a no printing condition. Therefore by providing additional paths for additional current to create an additional voltage drop in the record circuit to a point where a no printing condition is achieved. Then since there is a rise in voltage in 124, this when added to the 100 volts of the power supply raises the potential of anodes 120G and B to a higher voltage causing current also to flow from the junction of potentiometers 124—131 through the diodes 120G and B over to the anodes 31G and B. The voltage drop across 131 is greatest, since it carries all of the current. The voltage drop across 124 is less, however, because of the dividing current path. Therefore, in this case, the grid is still biased negative, relative to the cathodes, the bias would be less if it was not for the current in the resistors 122B and G. Since the diodes 120G and B are conducting this provides a shunt path for the current through 31 maintaining a bias which keeps the crater lamp from exposing for color.

It is apparent that the sliders on resistors 131 and 124 can be adjusted to provide further correction for color if desired.

Figure 9:
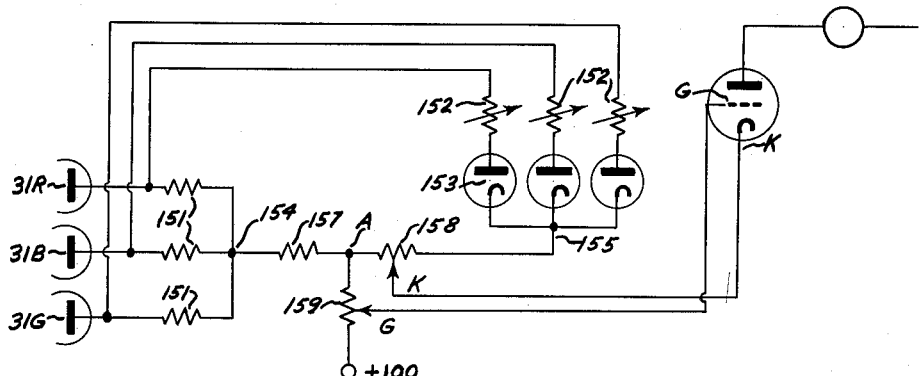
Fig. 9 is another schematic of a modification of the neutral density recording circuit.

Another manner in which the neutral density printer may be made is shown in Fig. 9, which, although similar to Fig. 8 is a simpler circuit in that the diodes 120 have been eliminated.

In this case, the anodes 31R, B and G of the color channel amplifier each have connected thereto a resistor 151, all of the resistors being joined together at 154 which is the end remote from the anode. Also connected to the color channel amplifier anodes through resistors 152 are the anodes of a set of diodes 153. The diodes 153 have their cathodes all connected together at 155. These are then connected to the point 154 through the resistors 157 and 158, the junction point of which is connected through the resistor 159 to the power supply. Resistances 158 and 159 are potentiometers, the sliders of which connect to the cathode (K) and grid (G) of the neutral density amplifier tube which can be as previously described.

It will be noted that a rise in voltage in any of the color channel amplifier anodes occurs due to that channel seeing a color. In the case of neutral density, in its various shades from black to white, that rise will be equal on all the anodes, the greater rise will be on scanning white which might be 250 volts. Since the balancing or reference voltage is assumed to be at 100 volts and is therefore at lower potential than the anodes, current will flow through each of the resistors 151 and collectively through 157 and 159. At the same time, the anode voltages of diodes 153 will rise and current will flow through the resistors 158 and 159. Therefore, there will be a voltage drop between the points K and G which will be of a value that varies with the neutral density and the neutral density signal will be recorded in that circuit. On black the anodes of 31R, B, G are at 100 volts, the same as the reference voltage and no bias is furnished to the recording tube which prints fully.

It should be noted that the current flows are from both sides of the circuit through resistors 157 and 158 to the junction point "A" and thence through the resistor 159 to the source of lower potential, and that the greater the voltage differential between points K and G, the greater the bias applied to the neutral density amplifier tube which drives that tube toward cutoff and reduces the light output from the crater lamp which, if it has no light, does not expose, and white is produced on the film.

Assuming that one of the color channel amplifiers should see a color, which, for instance might be red, and the anode 31R would rise to voltage such as 250, the currents due to color then flow to the other anodes through the resistors 151 as well as through the resistors 157 and 159 to the reference point.

But the current from the anodes 153 of which the one connected to 31R has now gone positive, now flows through the resistors 158 and 159 but may also be considered as flowing through the other resistor 157 to the anodes that are now at 100 volts. This causes a greater voltage drop across 158 again increasing the bias in the neutral density amplifier and drives current out of it resulting in non-exposure.

Should all of the channels have a voltage rise due to color and neutral density, the amount that the one color channel rises in voltage over the others due to color will cause a proportionate amount of color rise in the corresponding diode and this color will increase the bias on the neutral density amplifier tube which might otherwise have less bias due to a greater neutral density to enable less output from the tube and less exposure and thus to leave room for that color when it is later printed.

Figure 10:
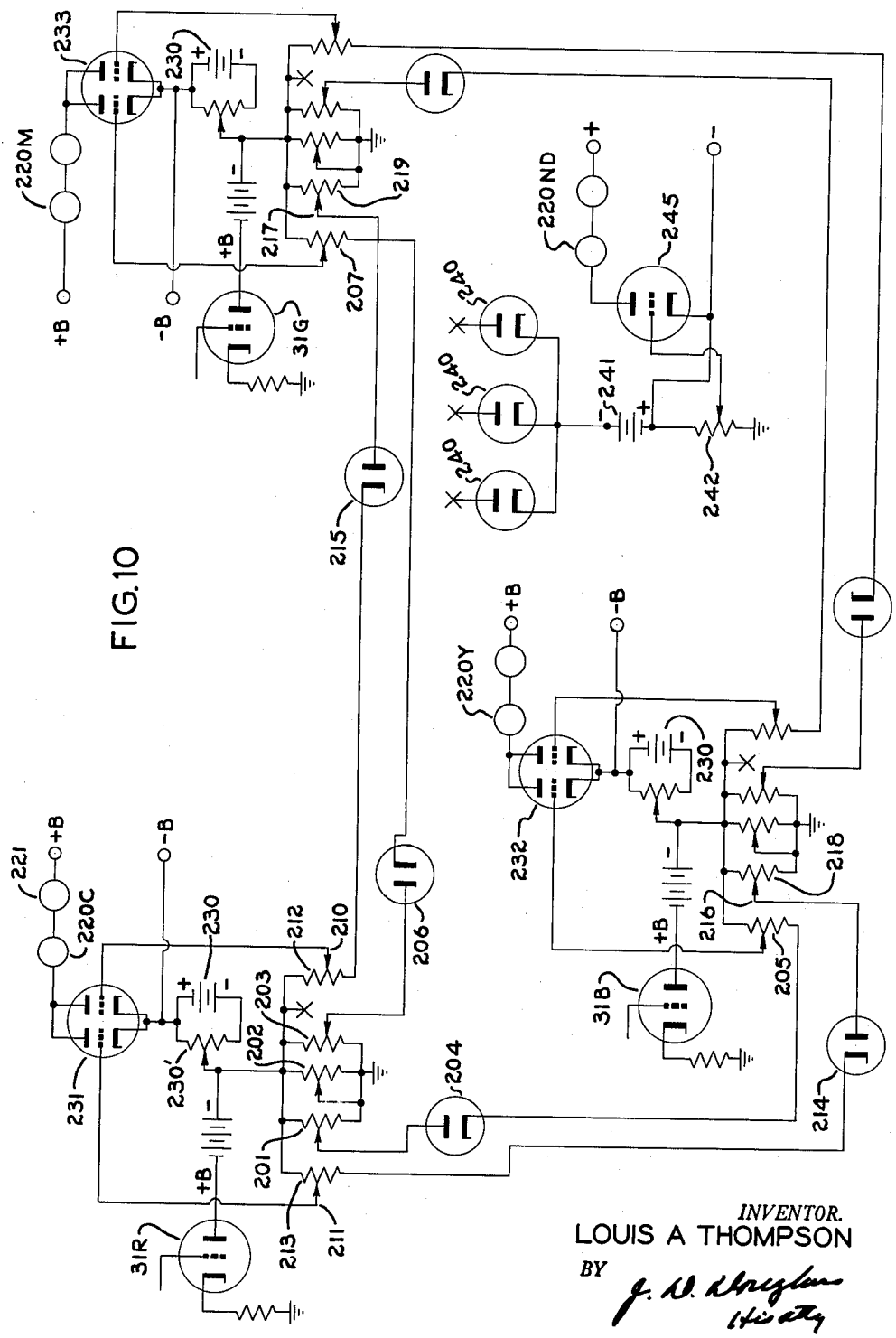
Fig. 10 is another schematic diagram of a circuit useful in making either tri-color or four color printers.

The circuit of Fig. 10 illustrates another form of the invention wherein certain refinements have been made that result in a simplification and increase the versatility of the apparatus as well as providing greater stability with less possibility of hum. It involves the same basic principle of operation as in the apparatus previously described in that it is particularly adapted for making printers for use in a subtractive process, by the use of the complementary colors of red, green and blue, namely, cyan, magenta and yellow. It also operates on the basis of providing a magenta and yellow printer to make red; yellow and cyan to make green; and cyan and magenta to make blue. The preamplifier tubes have been designated with their anodes as 31R, 31G and 31B which represent the same amplifier tubes as in the previous embodiment. I have found that if a pair of 12AX7 type tubes are used with their elements connected in parallel to provide four parallel triode sections, it results in averaging out of the characteristics of each section enabling any tube to be substituted for other tubes without upsetting the circuit and providing greater stability.

The cathode of the preamplifier tube is connected to ground through a cathode resistance of approximately 250 ohms which is sufficient to reduce the contact potential effect of the tube. The anode of the tube is connected to the positive end of its own source of voltage of approximately 150 volts, designated as plus B, the negative side of the power supply being connected to ground through three load potentiometers 201, 202 and 203. The potentiometers 201 and 203 are approximately 5000 ohms each while that of 202 may vary from 5000 to 50,000; 50,000 ohms being the preferred value. The slider on potentiometer 202 is connected to ground. This provides an equalizing means whereby the load in each leg or color channel may be adjusted to have the same value. The total load resistance which is represented by this combination when the resistances are all 5000 ohms is approximately 1600 ohms.

The slider on the load resistor 201 is connected to the anode of a diode 204, the cathode of which connects to a signal gain control potentiometer 205, the other end of which is connected to the negative side of the load in the blue channel scanner indicated at the bottom of the diagram. The slider connected to the load resistor 203 is likewise connected to the anode of a diode 206 the cathode of which is connected to a signal gain control potentiometer 207 which in turn is connected to the negative side of the load resistance in the green channel scanner.

The cathodes of the recording amplifier tubes 231, 232, 233, which may be 12AT7 tubes, are connected to the negative side of the preamplifier power supply through the sliders of potentiometer 230' that are disposed across 9 volt biasing batteries 230 the positive ends of which connects to the cathodes. The grids of the cyan recording tube, 231, which is at the red channel, are each connected to the sliders 210 and 211 of gain control potentiometers 212 and 213, the end of each potentiometer being connected to the negative side of the preamplifier power supply. The other end of each potentiometer 212 and 213 is connected to the cathode of a diode 214 and 215 respectively. The anode of diode 214 is in turn connected to the slider 216 of the load potentiometer 218 in the blue channel amplifier and the anode of 215 is connected to the slider 217 of the load 219 of the green channel amplifier. The potentiometers 218 and 219 each comprise a part of the load resistance in the blue and green preamplifier circuits respectively.

The anode of the cyan recorder tube is connected through a crater lamp 220C and a current indicating device such as a milliammeter 221 to the positive side of a recorder tube power supply. The negative side of the recording circuit power supply is connected to the cathode of the recorder tube.

If the scanner tube in the red channel is scanning white (and the others would also be scanning white), there results the development of a negative signal with respect to ground. The points at which the signals are developed are for convenience hereafter designated as "tri-corners." If this negative signal is applied to the grid of the red preamplifier tube it reduces the plate current through that tube and results in no signal being present in the tri-corner load resistances 201 and 203. Conversely if the scanner is scanning black there is no signal and no negative voltage on the grid of the preamplifier tube which is therefore drawing maximum current, and the greatest signal voltage is present in the tri-corner load resistors 201 and 203.

Signal voltage due to current variations in the load resistors 201 and 203 of the red channel amplifier are applied through the diodes 204 and 206 to the gain controls of the yellow and magenta recorders.

For instance, the yellow recorder amplifier tube 232 has its cathode connected to the amplifier load resistance in series with a fixed bias 230 which may be 9 volts. The anode of that tube connects to positive B through the recording crater lamp 220Y. The grids of this tube are connected to the gain controls and to the opposite tri-corners. The bias in the cathode circuit normally makes the grids negative with respect to the cathode. The other record amplifier tubes are connected in a similar manner.

When no signal is present at the gain control due to scanning picture white the bias in the cathode circuit is sufficient to hold the recording tube at cut-off and prevent recording. Conversely when scanning black, maximum signal is present at the gain controls which overcomes the bias between cathode and grid causing the tube to draw current and record.

The bias voltage being variable by reason of the potentiometer 230' the circuit may be set up by adjusting this bias when white is scanned to provide minimum current for exposure.

It will thus be seen that signals developed in the preamplifier due to the scanning of a color in that amplifier are developed in the two load resistors, and that these signals are fed through the diode to the gain control potentiometers that are disposed in the other two channels and which are connected by their respective sliders to the grids of the recording amplifier tubes to cause the production of a signal in each of the other two tubes. Thus if the red channel sees red the signal is recorded by the magenta recorder tube and the yellow recorder tube. If it only sees red these are the only tubes which will record color, the cyan record is not recording for, as previously stated, magenta and yellow are subsequently combined in the printers to make red. The cyan recorder tube does not record at this time because it is biased to cut off, or to a non-recording condition by the bias in the cathode, and since there is no current in the load 201—203 there is nothing to overcome that bias.

It should be pointed out that with the circuit as shown it is possible to record as a tri-color process. That is the three colors plus the neutral density. As the sliders of the potentiometers 201 and 203 are moved toward the negative side of the B supply in the red anode preamplifier, the under color or neutral density is removed. If the sliders are moved towards the ground side or are grounded no under color is removed. Thus if the sliders are at negative B all neutral density is removed and color only is recorded making a four-color process. The neutral density is obtained by a separate means which is separated from the main part of the diagram for the purpose of clarity.

Thus in each of the records the neutral densities will be recorded when the sliders on the load resistors such as 201 and 203 are at the ground and because each channel sees it in equal amounts. The lighter the neutral density the lighter the recording.

The sliders on the load resistances, from which the signals are taken, provide the greatest under color signal when moved toward ground. Should the sliders be moved toward the negative end of the load resistances, away from ground, less of the neutral density signal will be reproduced and as a result, neutral density or under color may be partially or completely removed. This is because when the sliders were at the ground end of the load on the load they were in substance all tied together at the same potential and all grounded. The signal on any or all channels appearing through the load resistors overcomes the bias on the cathode. If there is no signal, due to the channel seeing, there is no voltage drop in the load and the cathode bias is effective to prevent the recorder tube from drawing current and there is no recording. If a signal appears which is neutral density, it is present in all loads, therefore, all cathodes are overcome according to the strength of the signal and draw current and record. If the red channel saw red this would limit the current in the load resistor and the bias in the cathode of the recorder prevents recording which is desirable because it is the cyan printer.

If, however, the slider connecting to the grids is moved to the top of the load resistance, then the potential on the various grids may vary with respect to each other.

A variation in voltage drop across the load in any one channel causes a variation in potential of the sliders which connects to the recorder grids in the other two channels. This is in effect an additional negative bias. At the same time the change in potential across the load in each is being effective to overcome the cathode bias of the recorder of its own channel. The other voltages appearing across the load resistors for the other two channels are also effecting the grids of this channel. Since the neutral density is seen by all channels equally and color is only seen by the channel which is intended to see a particular color, due to filter response, these grids of the other two may have a potential variation due to the fact that they are now above ground and no longer effectively tied together. Any signal appearing across a load in a channel due to color will cause a negative potential to be applied to the control grids of the other channel recorders which are not seeing color and they will record. If the same signal is present in more than one channel the drop in voltages across the loads are equal and there is no difference between cathode and grids and no recording.

For instance, if neutral density in the form of white or black, or, shades in between, is scanned, it is viewed by all the channels equally the voltages across all the load resistors will be equal. Since no voltage has been created between cathodes and their respective grids there is no recording of neutral density.

If one channel sees color without any response in the other two channels these two channels will record because the load resistor voltage of each of these two channels have overcome the cathode bias but their grids have not received negative bias from the seeing channel. Therefore, in this case the other two channels record.

If one channel sees color and neutral density all channels see the neutral density but the channel seeing the color has the voltage across the load resistor reduced according to the color seen and this voltage or lack of voltage fails to or only partially biases the grids in the other channels and these channels due to neutral density present only record the difference between this color and neutral density.

When it is desired to record the neutral density separately, as in the four color process, the sliders of the under color potentiometers 201 and 203 are adjusted toward the negative B end to remove the under color as previously described. Three diodes 240 are provided each one of which has its anode connected at X to the negative end of the load resistance in each respective color channel. The cathodes of all three diodes are connected together and through a biasing voltage 241 and load resistance 242 to ground. The neutral density recording tube 245 has its grid connected to the slider on the resistance 242 and its cathode connected to the positive side of the bias 241. The anode of the neutral density recording tube connects through a crater lamp 220ND to the positive side of the recorder tube power supply and the cathode to the negative side. When neutral density or under color is seen by the color channels the signal developed and applied to the preamplifier depends on the density. When black is being scanned, since current is flowing in the load 201—203, the ground end of the load becomes positive and there is no voltage drop in the load resistor 242. Since the cathode and grid of the neutral density recorder tube are at substantially the same potential the recording tube draws current and black is recorded. When white is being scanned, this being the other extreme from black where there would be no neutral density, the preamplifier tube would be cut off and there would be no voltage drop in the load 201—203 hence the ground point would be negative. At this time the diode 240 conducts because the anodes are positive relative to the cathodes. The current flow through the resistor 242 would make the grid of the crater lamp amplifier tube negative with respect to the cathode, cutting off the current and there would be no recording in the neutral density circuit providing picture white. The current will decrease with an increase in neutral density and the value of the current flow will determine the amount of neutral density recorded.

It will thus be seen that photographic separation negatives may be recorded and that results may be achieved by my system that are superior to those that could be attained by the known photographic processes. By this system regular tri-color may be recorded or the neutral density dropped out and recorded separately to provide a four color system. Furthermore, the tri-color may be adjusted for under color or neutral density not only on the three primaries but also on all six secondary colors which enables the correction to be applied as previously discussed. For instance, if there should be too much yellow in the yellow printer and it came from the red channel amplifier section (this might be due to an unbalance in color in the original picture) the control can be adjusted to remove yellow as desired.

Having thus described my invention in several embodiments thereof I am aware that numerous and extensive departures will be apparent to those versed in the art without departing from the spirit of the invention as is defined in the appended claims.

I claim:

1. An apparatus for making four color printers from an original wherein the original is scanned to provide three color signals in three separate channels, said channels each representing red, green and blue and its proportionate share of neutral density of the color being scanned including means in each channel to amplify said signals, each of said amplifiers having a load resistor, the end of which is above ground and wherein each terminates at a common point, and means to remove from each load resistor a signal and for applying said signal to an amplifier, the output of which controls an exposure means, said exposure means being biased against exposure during the absence of a signal.

2. An apparatus for scanning a colored picture and producing at least three separate signals, each of which is representative of a primary color in said signal plus neutral density, means for abstracting and recording the primary colors and eliminating the neutral density, comprising amplifier means for each of said signals, and load means connected to each of said amplifiers and having the ends remote from the amplifiers connected to each other at a common point whereby voltage differences in said amplifier means causes current flow toward the low potential ends of said load means, means for removing signals from said load means comprising separate amplifier means connected across at least a portion of each load means and arranged to amplify in response to a rise in potential in each load means that is greatest at the end toward said common point.

3. An apparatus for making color-corrected separations from a colored picture or the like, comprising scanning means for producing light effected by said picture, including means for separating the light transmitted or reflected by said picture into its primary components which include red, blue and green components where there are either one or all thereof in said picture each having therein such neutral density as is in the original element being scanned, comprising separate amplifier means for each of said components, each of said amplifiers including an input and an output, means for removing and separately recording the individual primary color components from said channels comprising load means for each of said amplifiers each of which is connected to the other at a common point, means for abstracting from said load means signals which are representative of the potential differences across said load resistors and the common point comprising separate color amplifiers each of which includes a vacuum tube having a grid, a cathode and an anode wherein each input circuit comprises a grid and cathode with the grid connected to said load means closer to said common point than said cathode, bias means for said color amplifier for biasing said amplifiers to cut off in the absence of a signal on the grid, and recording means in the anode circuit of each of said color amplifiers for recording in the presence of a signal on the grid great enough to overcome said bias, means for abstracting and recording the neutral density from said signals including means for abstracting and combining all of said colors from said first amplifier means comprising diodes each having its anode connected to the anode of each of said amplifiers and having their cathodes connected directly together, load means in the cathode circuit of said diodes connected to said common point, means for abstracting a full panchromatic signal from said first mentioned amplifier comprising a second set of diodes having their anodes connected to said first amplifier anodes and their cathodes connected together and through a common load resistance to the cathode of said first mentioned amplifier, a neutral density amplifier comprising a vacuum tube having a cathode, a grid and an anode and means for connecting the grid to the second set of diodes and means connecting the cathodes to the first set of diodes, and recording means in the output of said neutral density amplifier.

4. An apparatus for making color-corrected separations from a colored picture or the like, comprising scanning means for providing light effected by said picture including means for separating the light transmitted or reflected by said picture into its primary components which include red, blue and green components where there are either one or all thereof in said picture each having therein such neutral density as is in the original element being scanned, comprising separate amplifier means for each of said components, each of said amplifiers including at least a cathode, a grid and an anode element and each of said amplifier means being arranged to draw full current when no signal is on the grid and to have the current reduced proportionately to the amount of signal on the grid, means for removing and separately recording the individual primary color components from said channels comprising load means for each of said amplifiers each of which is connected to the other at a common point, means for abstracting from said amplifiers signals which are representative of the potential differences across said load resistors and the common point comprising separate color amplifiers each of which include a vacuum tube having a grid, a cathode and an anode wherein each input circuit comprises a grid and cathode and is connected to each of said load resistors and said common point, bias means for said color amplifier for biasing said amplifier to cut off in the absence of a signal on the grid, and recording means in the anode circuit of each of said color amplifiers for recording in the presence of a signal on the grid, great enough to overcome said bias, means for abstracting and recording the neutral density from said signals including means for abstracting and combining all of said colors from said first amplifier means comprising diodes each having its anode connected to the anode of each of said first amplifiers and having their cathodes connected directly together, load means in the cathode circuit of said diodes connected to said common point, means for abstracting a full panchromatic signal from said first mentioned amplifier comprising a second set of diodes having their anodes connected to said first amplifier anodes and their cathodes connected together and through a common load resistance to the cathode of said first mentioned amplifier, a neutral density amplifier comprising a vacuum tube having a cathode, a grid and an anode and means for connecting the grid to the second set of diodes and means connecting the cathodes to the first set of diodes, and recording means in the output of said nuetral density amplifier.

5. An apparatus of the class described comprising a scanner for scanning a colored picture and for producing from said picture signal discrete voltages each representative of a primary color in said picture and wherein each of said signals has signal voltages therein representative of the neutral density of said picture, an amplifier for each of said color signals controlled thereby and including a vacuum tube having input comprising at least a cathode and a control grid and an output including at least an anode and said cathode, a voltage supply connected to each anode and load means connected between said voltage supply and said cathode, the ends of said load means for each amplifier being connected together, a recorder amplifier for each channel, each of said amplifiers including a vacuum tube having at least a cathode, a grid and an anode, said cathodes of each recorder amplifier having a positive biasing means, connected thereto and the end of said biasing means remote from the cathode being connected through the load means of its associated color channel amplifier to said common point, recording means connected to the anode and cathode of each recorder amplifier and each recording amplifier having control grids which are connected to the load means of the other channel amplifiers.

6. A device as described in claim 5 wherein the signal take off for the load means is movable between the common connection point for the load means and the anode voltage supply.

7. An apparatus for making color-corrected separations from an original color picture comprising scanning means for scanning said picture and developing signal voltages that are representative of the red, green and blue colors and neutral density in said picture separate color channel amplifier means for each of said color signals including a vacuum tube having input electrodes including at least a grid and cathode and output electrodes including at least an anode and a cathode, anode voltage supply means for each amplifier directly connected to the anode, and load means connected between said supply means and said cathode, each of said load means for said separate amplifiers being connected together at a point remote from the power supply, separate recorders for recording said signals each including a recorder amplifier comprising a vacuum tube having at least a grid, a cathode and an anode, the cathode of each recorder amplifier having a bias connected thereto and said bias being connected through the load means for the channel amplifier to said common connecting point, said load means for each channel amplifier having means connected thereto for abstracting signals therefrom including a unilateral conducting device which is connected to the load means in each of the other channels at said common connecting point and signal take off means from said unilateral conducting means connected to the grid of said recording amplifier.

8. Apparatus for making color printers for use in a subtractive color process which comprises means for scanning an original object with at least three light sensitive, signal producing elements, each of which elements is sensitive to light of a different one of the primary colors of which said original object is comprised, means for balancing the output signals of said elements against each other to remove all components representative of neutral densities from the output signals of the said light sensitive elements, and means for combining the neutral density components of said output signals to produce a black printer signal, and means for converting said black printer signal to light to expose a photosensitive surface and form a black printer.

9. Apparatus for reproducing pictures in color comprising means for simultaneously scanning each elemental part of an original multi-color object with three light sensitive elements, said light sensitive elements being sensitive respectively to green, red and blue, said elements producing output signals representative of the intensity of light of the color to which the element is sensitive reflected from said object, means for balancing the output signals of all the said elements against each other to remove components of said signals representative of neutral density in said original object, means for utilizing the remaining components of said signals to reproduce complementary color separation printers for each of said colors green, red and blue, and means for combining the neutral density components balanced out of the signals of said light sensitive elements to provide a black printer signal, means for converting said black printer signal to light for exposing a photosensitive surface to form a black printer, and means for combining said color printers and said black printers to form a color reproduction of the original object.

10. Apparatus for making color-corrected separations of an original multi-colored object which apparatus comprises means for scanning the original object and for developing separate electrical signals each of which is representative of one of the primary color components including neutral density of said original object, means for eliminating from each of said separate signals that portion thereof representative of neutral density to provide separate color component signals, means for continuously comparing said color component signals to determine differences therebetween and develop difference signals, means for converting said difference signals to light for exposing separate photosensitive surfaces to form color printers, means for developing a signal representative of all color components without neutral density, means for developing a signal representative of all color components including neutral density, means for combining said last-named signal not including neutral density with said last-named signal including neutral density to provide a signal having neutral density components only, and means for converting said signal having neutral density components only to light to expose a photosensitive surface to form a black printer.

References Cited in the file of this patent

UNITED STATES PATENTS

| | | |
|---|---|---|
| 2,278,940 | Murphy | Apr. 7, 1942 |
| 2,691,696 | Yule | Oct. 12, 1954 |
| 2,710,889 | Tobias | June 14, 1955 |
| 2,740,828 | Haynes | Apr. 3, 1956 |
| 2,842,610 | Crosfield | July 8, 1958 |